United States Patent [19]

Johnson

[11] 4,276,342
[45] Jun. 30, 1981

[54] MOISTURE PROOF MATTING

[76] Inventor: Elwood O. Johnson, Box 773, Casa Grande, Ariz. 85222

[21] Appl. No.: 46,215

[22] Filed: Jun. 7, 1979

[51] Int. Cl.³ .............................................. B32B 7/00
[52] U.S. Cl. .................................. 428/247; 428/255; 428/256; 428/489
[58] Field of Search ............... 428/109, 110, 111, 247, 428/255, 256, 260, 262, 291, 489; 427/443, 402

[56] References Cited

U.S. PATENT DOCUMENTS

| 2,812,570 | 11/1957 | Petersili et al. | 428/229 |
|---|---|---|---|
| 3,132,099 | 5/1964 | Elhauer | 210/507 |
| 3,193,439 | 7/1965 | Price et al. | 428/489 |
| 3,297,461 | 1/1967 | Siddall | 428/256 |
| 3,457,136 | 7/1969 | Zaadnoordyk | 428/489 |
| 3,474,625 | 10/1969 | Draper et al. | 428/489 |
| 3,721,578 | 3/1973 | Bennett et al. | 428/291 |
| 3,884,727 | 5/1975 | Jacobs | 428/256 |
| 4,035,544 | 7/1977 | Iwasaki et al. | 428/291 |
| 4,055,925 | 11/1977 | Wasserman et al. | 428/256 |

FOREIGN PATENT DOCUMENTS 1394997  5/1975  United Kingdom .................... 428/291

Primary Examiner—James J. Bell
Attorney, Agent, or Firm—Cahill, Sutton & Thomas

[57] ABSTRACT

A sheet of reinforced tar is produced by repetitively coating a mesh with hot tar until all of the voids in the mesh are filled. The mesh employed may include relatively heavy gauge strands interwoven with light gauge strands to reduce the size of the voids and reduce the number of coatings necessary to produce the sheet; alternatively, a layer of loosely woven material may be combined with the mesh to augment the base for the coatings of hot tar.

2 Claims, 4 Drawing Figures

MOISTURE PROOF MATTING

The present invention relates to sheet materials and, more particularly, to reinforced sheets of a tar compound.

In the construction industry there exists a continuing need for impervious weather resistant sheet materials to constrain flow or seepage of water, to prevent incursion of vegetation and to establish barriers against insects. Such sheet materials are used under external roof elements, adjacent sides of buildings, adjacent above ground and under ground foundations for various structures, lining water tanks, enclosing joints of both above ground and under ground pipes or conduits and for shingles. The material employed must have certain inherent structural characteristics which include resistance to puncture and tearing, a certain degree of flexibility without danger of cracking or rupture and permit the use of various conventional attachment means to secure the sheet material in place.

Conventional roll tar paper is widely used as a protective barrier but such tar paper is easily punctured, torn and ruptured; it also has little tensile strength. Plastic sheeting of various thicknesses have become widely used recently as it is inexpensive; but, it tends to be easily punctured by normal handling during installation. Moreover, most plastic sheeting will deteriorate if subjected to ultra-violet light.

Further descriptions of the state of the prior art may be deduced from the teachings contained in the following patents. U.S. Pat. No. 3,135,069 describes an in situ waterproof roofing material formed by spraying hot tar material upon a perforated metal or fibrous base attached to the roof of a structure. U.S. Pat. Nos. 1,799,637 and 1,811,039 are directed to multi-layered strand mesh coated with cementitious material. U.S. Pat. No. 2,005,221 describes a multi-play flashing structure having an outer layer of mesh sprayed with asphalt material and an inner layer of copper foil bonded to the outer layer with mortar. U.S. Pat. Nos. 4,035,544 and 4,107,375 are directed to impregnation of a bulky sheet of non-woven fabric with asphalt material by passing the fabric through a bath of the asphalt material. And, U.S. Pat. Nos. 2,838,414 and 3,994,735 describe compositions useable for coating and waterproofing purposes. As may be noted, all of these reinforced sheet materials are limited in flexibility, of substantial relative thickness or of limited inherent structural rigidity.

It is therefore a primary object of the present invention to provide a reinforced sheet of tar compound.

Another object of the present invention is to provide a sheet of tar compound reinforced by an encapsulated wire mesh.

Yet another object of the present invention is to provide a mesh having interwoven strands and enveloped within a tar compound and defining a sheet material.

Still another object of the present invention is to provide a wire mesh juxtaposed with loosely woven fabric and enveloped within a tar compound and defining a sheet material.

A further object of the present invention is to provide an impervious and pliant waterproofing material which is puncture and tear resistant.

A yet further object of the present invention is to provide a reinforced flexible impervious waterproof material for protecting conduit joints against incursion of vegetation.

A still further object of the present invention is to provide a method for enveloping a wire mesh with a tar compound to produce an impervious waterproof flexible reinforced sheet material.

These and other objects of the present invention will become apparent to those skilled in the art as the description thereof proceeds.

The present invention may be described with greater specificity and clarity with reference to the following drawings, in which.

Figure 1:
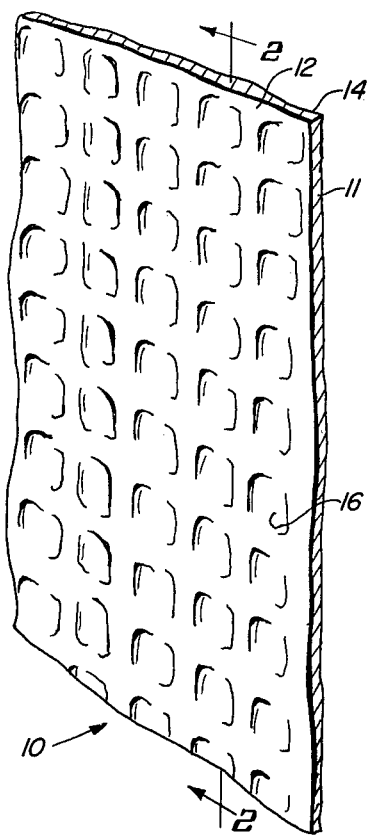
FIG. 1 is a perspective view of the sheet material.

Referring to FIG. 1, there is shown a length of sheet material 10, which sheet material is predominately a composition of a tar compound 11 supported upon an encapsulated mesh. Opposed planar surfaces 12 and 14 are pock marked, as indicated by the depressions identified by numeral 16. The pock marked surface results from repetitive dipping or spraying of the mesh with the tar compound to repetitively coat the mesh. Each coating adds a further quantity or buildup of tar compound within each of the voids of the mesh and upon the strands of the mesh. Necessarily, the overall thickness of the sheet in each former void of the mesh is less than the overall thickness of the sheet at the locations of the strands or wires forming the mesh. Hence, a plurality of ridges coincident with the major strands or wires of the mesh circumscribe each of depressions 16. It is to be understood that the thickness of each coating, the number of coatings and the ultimate thickness of the sheet material is dependent upon several factors, including the tar compound itself, the viscosity of the tar compound, the degree of curing intermediate repetitive coatings, the quantity of tar compound adhering during each coating, etc.

The properties of various tar compounds are well known with respect to their waterproofing characteristics, continuing elasticity over a period of years, configurational stability in the absence of application of heat to bring its temperature close to the melting temperature, and receptivity and adhesion to various paints. The encapsulated mesh, whether it incorporates flexible or formable metallic strands, provides structural rigidity to the sheet material and permits the sheet material to be rolled, bent or otherwise molded to conform with a specific configuration. The inherent flexibility of the tar compound will, of course, allow the tar to conform to bending of the sheet material without rupture or tearing. Accordingly, sheet material 10 may be employed in all but extreme temperature environments for waterproofing purposes, as barriers against incursion of vegetation and as self-supporting shields attached to an underlying surface.

Figure 2:
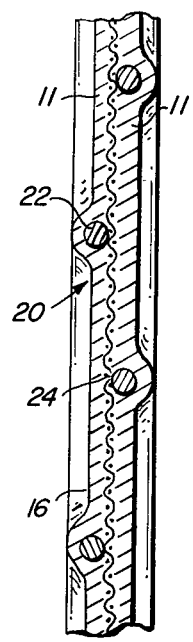
FIG. 2 is a cross-sectional view taken along lines 2—2, as shown in FIG. 1.

Referring to FIG. 2, there is shown a cross-section of sheet material 10 taken along lines 2—2, as shown in FIG. 1. The primary structural support for the sheet material is provided by mesh 20 which may be a wire mesh having strands 22 of copper wire defining the mesh. Depressions 16, illustrated in FIG. 1, are commensurate with the voids intermediate crossed sets of parallel strands 22.

To provide a supporting surface for tar compound 11 within the voids defined by the wire mesh and thereby reduce the number of coatings necessary to fill the voids with tar compound, a finer mesh of natural or synthetic strands is interwoven with mesh 20. The fine mesh may also include voids intermediate the crossed strands but the voids are of relatively small size. On adhesion of the tar compound to the strands of the fine mesh, the small voids thereof quickly fill up. Thereby, the larger voids intermediate wire mesh 20 are filled with tar compound 11 supported by the strands of the fine mesh. As illustrated in FIG. 2, each coating also increases the depth of encapsulation of each of strands 22.

Figure 3:
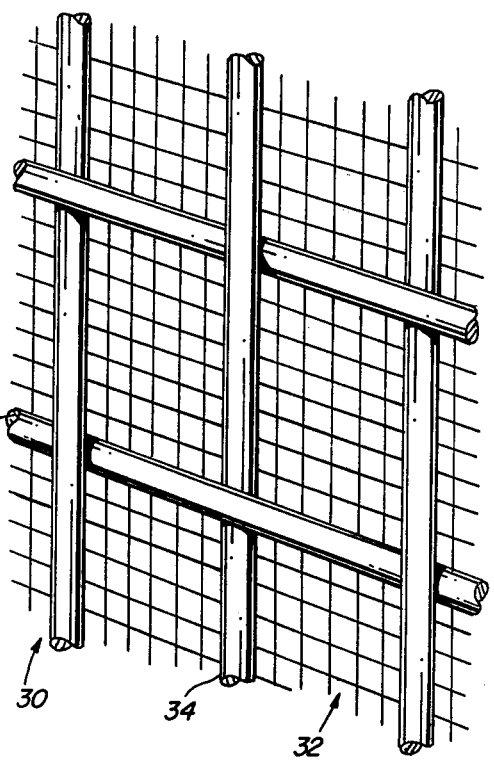
FIG. 3 is a perspective view of a mesh to be coated with a tar compound.

FIG. 3 illustrates a variant of the present invention wherein a mesh 20, which may be a wire mesh having metallic strands 34 such as copper, is juxtaposed on one side with loosely woven material 32. It is to be understood that mesh 30 may be a plurality of crossed strands 34 rather than a mesh; similarly woven material 32 may be a plurality of individual strands placed upon strands 34.

The combination of mesh 30 and woven material 32 is subjected to a tar compound by dipping or spraying the composite structure. Each dip or spray will deposit a coating or buildup of tar compound 11 upon both mesh 30 and woven material 32; the coating process is continued until all of the voids intermediate strands 34 of the wire mesh are filled. On completion of the dipping or spraying steps, the resulting structure will resemble sheet material 10 illustrated in FIG. 1.

It is to be understood that the number of coatings applied to a mesh may vary substantially, depending upon the thickness of the coating desired and the total thickness of the resulting sheet material. In example, thin membranes which are readily bendable without danger of rupture or cracking and yet having all the benefits of being impervious and waterproof can be developed by close control and regulation of the tar compound itself, the dip or spray time and the degree of curing permitted between coatings.

While the wire mesh having copper strands has been described as the preferred embodiment, it is to be understood that other metallic materials may be used as well. Moreover, non-metallic meshes, whether of natural or man-made fibers, can also be used without departing from the scope and benefits attendant the present invention.

For some applications it may be preferable to employ a mesh-like substructure having a plurality of parallel crossed sets of strands rather than a mesh; such substructure may be dictated by various material and cost considerations. Additionally, the parallel crossed sets of strands may be set at a bias to one another so as to promote bending or flexibility in one direction while constraining bending or flexibility in another direction. A substructure of this type for the sheet material is particularly useful where the material may be subjected to tension or compression loads in predeterminable directions.

The process for constructing the present invention may vary but the following described method is representative. The wire mesh is suspended from or mounted upon a framework in order to achieve positional control over it. If a fine mesh is employed, it may be interwoven with the wire mesh, as illustrated in FIG. 2, or it may be attached to one or the other side of the wire mesh as illustrated in FIG. 3. Alternatively, the voids intermediate the wire mesh may be segregated into smaller voids by strands of material placed across the wire mesh in one or more directions. The juxtaposed fine mesh or fine strands may be maintained in positional relationship to the wire mesh by gravity, by a jig or by spot cementing. The substructure, whether it be the wire mesh alone or the wire mesh in combination with a fine mesh or in combination with fine strands, is either dipped into a vat of tar compound or sprayed with the tar compound. After the initial coating is applied, it will maintain the fine mesh or fine strands in adhering relationship to the wire mesh. Similarly, if strands in a format other than a mesh is employed they must be positionally maintained during application of the first coating, whereafter the first coating will maintain them in place.

The process of dipping or spraying is repeated until such time as all voids are filled or until the resulting sheet material has achieved a predetermined thickness. Between each dipping or spraying step, at least some curing of the tar compound is permitted to insure that the subsequent coating will adhere to and not wash off the previous coating.

Figure 4:
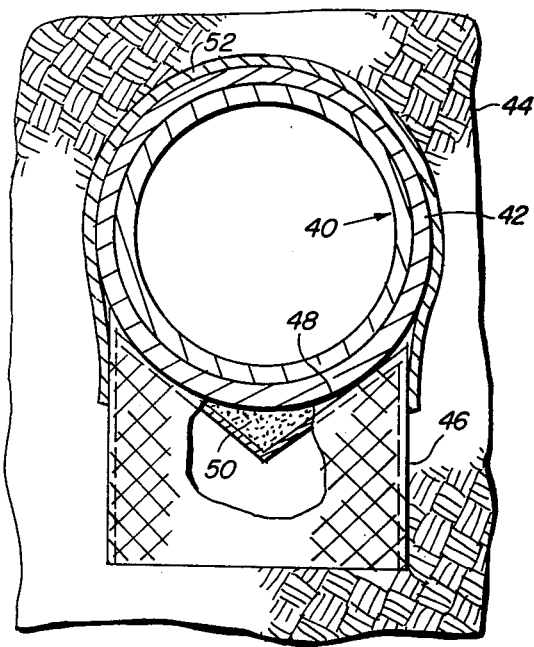
FIG. 4 is a cross-sectional view illustrating use of the sheet material in conjunction with a conduit joint.

Referring to FIG. 4, there is illustrated apparatus employing sheet material 10 for sealing a joint of a conduit 40 embedded within the ground. To prevent the roots of vegetation from penetrating into an underground conduit, a physical barrier must be used. As most underground conduit for sewage does not include a physical seal at the joints, the roots will grow into and through any existing interstices at the joint and subsequently grow within the conduit itself and clog the flow therethrough.

Conduit 40, having a radially extended flange 42 for mating with the end of an abutting section of conduit is shown lodged within earth 44. A box-like structure 46 is disposd beneath the joint of conduit 40 and extends for a distance in each direction along the conduit from the joint. The purpose of structure 46 is that of establishing and maintaining an air space directly below the joint, which air space tends to preclude the growth of roots or other vegetation thereinto. The upper surface of box-like structure 46 includes a V-shaped depression 48, which depression receives the adjacent surface of the conduit and joint. To prevent growth of vegetation longitudinally within depression 46, salt 50 or a similar growth impeding chemical composition is deposited in the depression in contacting relationship with the adjacent joint.

A sheet 52 of the type illustrated in FIG. 1, is draped over conduit 40 at the joint and extends for a distance in each direction from the joint. Sheet 52 circumscribes conduit 40 to a point equivalent to the upper extension of the sides of box-like structure 46. Thereafter, the sheet depends downwardly along the sides of the structure. Sheet 52 may be maintained in place by spot cementing with any one of various adhesives; alternatively, the sheet may be simply draped over conduit 40 to depend therefrom along the opposed sides of structure 46 and maintained in juxtaposed relationship thereto by the force exerted by adjacent packed earth 44.

As stated previously, sheet 52 inhibits penetration of vegetation therethrough and thereby prevents incursion of vegetation into the joint at the sides and top of the joint. Incursion of vegetation into the lower part of the joint is inhibited by the air space defined by structure 46 in combination with the salt bed intermediate the lower part of the conduit and depression 46 of the structure. Thereby, the joint in conduit 40 is effectively sealed against penetration by vegetation.

At locations where installation of structure 46 is impractical because of rocks or where the costs attendant thereto are prohibitive, sheet 52 may be wrapped about the joint in overlapping relationship. It may be maintained in place by the force of adjacent packed earth or by adhesive means. By constructing sheet 52 to be quite pliable it can be made to closely conform with the contour of the annular expansion attendant the joint to minimize the existance of interstices between the sheet and the outer surfaces of the two abutting conduits.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A reinforced moisture proof impervious flexible sheet material comprising in combination:
    (a) a first bendable mesh for providing primarily structural support for said sheet material, said first mesh including a first plurality of unbroken continuous crossed elements of a first cross-section and extending intermediate the respective edges of said sheet material, said cross elements defining first sized voids in said first mesh;
    (b) a second bendable mesh juxtaposed with said first mesh for dividing each of the first sized voids into a plurality of second sized voids, said second mesh including a second plurality of unbroken continuous crossed elements of a second cross-section and extending intermediate the respective edges of said sheet material;
    (c) at least one coating of a flowable curable tar compound for encapsulating and only incidentally penetrating said first and second plurality of elements of said first and second meshes, respectively, and for preventing relative movement of said first and second plurality of elements relative to one another at their respective intersections;
    (d) said sheet material including an undulating surface formed by said tar compound on opposed sides of said sheet material and extending across said second sized voids intermediate said second plurality of elements of said second mesh which surface conforms with the outline of said tar compound encapsulated first plurality of elements, said second plurality of elements, said first sized voids, said second sized voids and their relative thicknesses and interstices;

whereby, said non-smooth surfaced sheet is impervious and bendingly conformable to various curvatures through bending of said first and second plurality of elements without relative movement therebetween at their respective interstices.

2. The sheet material as set forth in claim 1 wherein said second plurality of elements of said second mesh are interwoven with said first plurality of elements of said first mesh.

* * * * *